June 21, 1960  K. O. JOHNSON  2,941,848
SPRING LOAD BEARING SUPPORT
Filed Oct. 24, 1955  2 Sheets-Sheet 1

INVENTOR.
Kenneth O. Johnson
BY Paul Fitzpatrick
ATTORNEY

INVENTOR.
Kenneth O. Johnson
BY Paul Fitzpatrick
ATTORNEY

United States Patent Office 2,941,848
Patented June 21, 1960

2,941,848

SPRING LOAD BEARING SUPPORT

Kenneth O. Johnson, Camby, Ind., assignor to General Motors Corporation, Detroit, Mich., a corporation of Delaware Filed Oct. 24, 1955, Ser. No. 542,179

19 Claims. (Cl. 308—26)

My invention relates to load supporting structures which are adapted to accommodate relative expansion of the parts.

Gas turbine engines are an example of machines which have relatively great and rapid thermal expansion in service. For this reason, rigid structures may be unsuitable for such engines because stresses due to unequal thermal expansion may cause failures of the parts. This is particularly true of structures in the exhaust duct of the engine, such as turbine rotor bearing supports at the exhaust end of the engine and afterburner structures.

Because of the use of such engines in aircraft, the structures must be light but also must withstand loadings many times the normal static load caused by maneuvers or buffeting of the aircraft in which the engine is mounted.

The preferred embodiment of the invention illustrated herein is a support for an exhaust end bearing of an aircraft gas turbine. Referring more particularly to this embodiment, it has been common practice to support such bearings by a bearing support or spider comprising radiating arms which extend across the exhaust passage of the engine and are connected to the engine casing or outer exhaust duct. Because of differential expansion of the casing and spider, slidable pin and socket joints have been provided between the spider and case. While this disposes of structural problems resulting from unequal expansion, the resulting structure does not have very desirable strength characteristics. Assuming a maneuver of the aircraft which creates a dynamic load on the spider transverse to the turbine axis, the struts or arms which are aligned with the direction of this force, and on which the load impresses a tension or compression stress, may more readily take the load than the other arms, which must resist the load by acting as a beam and resisting bending of the arms. However, the arms cannot accept a tensile or compressive load because of the slip connection to the casing. Therefore, the entire load is carried by the arms transverse to the load acting as beams. This requires an undesirably heavy spider structure.

In accordance with this invention, the prior structure referred to is modified by the addition of springs or the equivalent which resist radial movement of the spider with respect to the axis. The springs will yield to accommodate relative displacements due to temperature differentials and thus prevent destructive loads of this character. However, the springs assist in taking radial loads on the arms by compression of the springs, thus reducing the bending load on the struts which are not approximately parallel to the direction of the load.

The nature of the invention and the advantages thereof will be more clearly apparent from the succeeding detailed description of preferred embodiments of the invention and the accompanying drawings in which.

Figure 1:
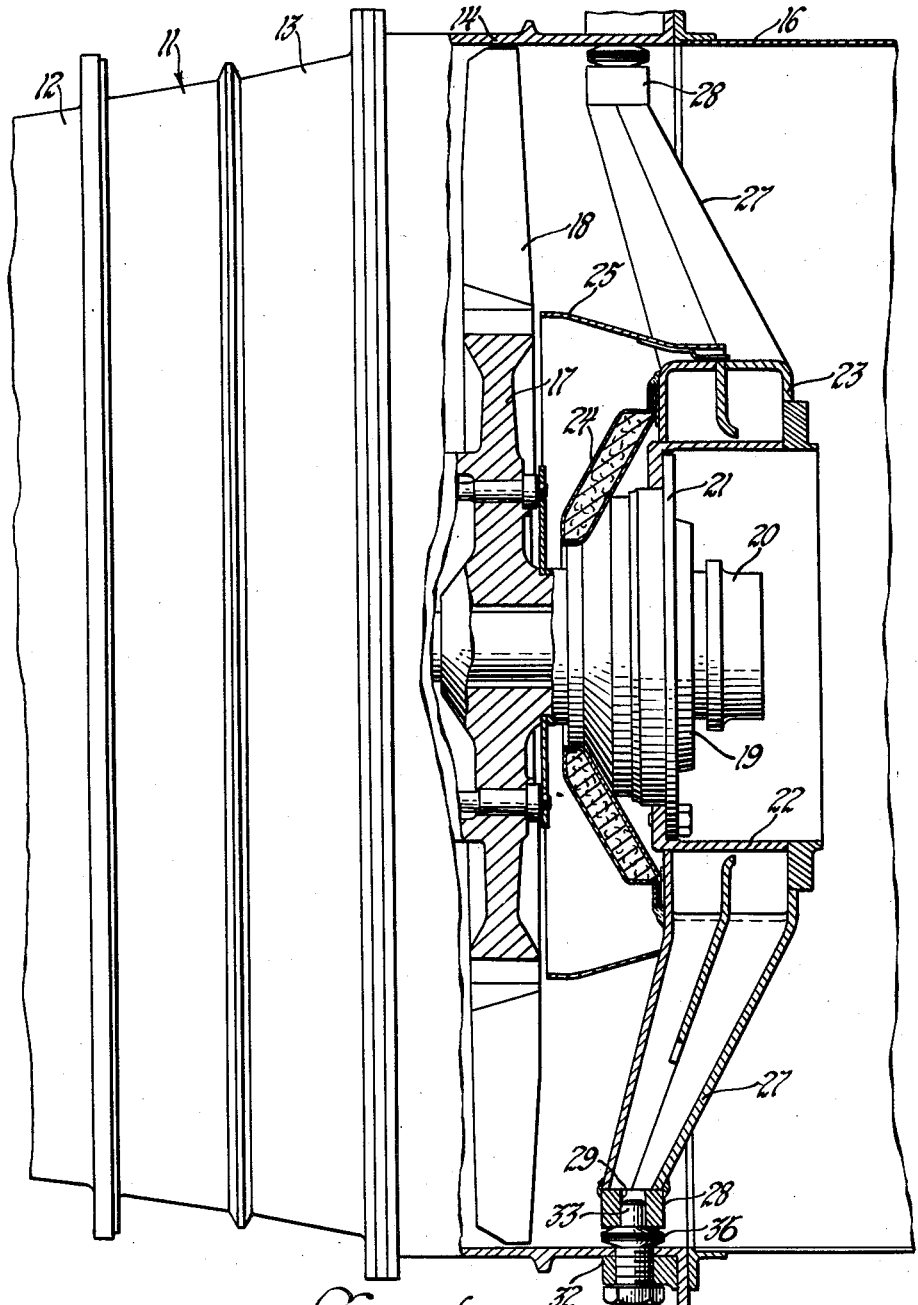
Figure 1 is a partial view of an aircraft gas turbine, certain parts being shown in section on a plane containing the axis of the turbine.

Referring to Figure 1, there is illustrated a gas turbine including a turbine casing or stator 11 which may be made up of annular sections 12, 13 and 14 bolted or otherwise fixed together. A flanged exhaust duct 16 is bolted to the discharge end of the turbine case. A turbine rotor, comprising a final wheel 17 mounting blades 18, is rotatably mounted in the turbine casing by a bearing, indicated generally at 19, for the turbine shaft 20. The details of the bearing assembly 19 are immaterial. It comprises a flange 21 bolted to a bearing support ring 22 forming part of a spider by which the bearing and rotor are supported from the turbine casing. The spider comprises a welded structure consisting principally of the ring 22, a channel shaped ring 23 welded to the ring 22, and preferably six arms or struts 27 radiating from the ring 23. Parts 22, 23 and 27 constitute a unitary welded structure of formed sheet metal parts, the details of the structure and fabrication of which are immaterial. A ring 24 of heat insulating material may be fixed to the front of ring 23 to shield the bearing from the heat of the turbine. A portion 25 of the inner exhaust cone is illustrated.

Figure 2:
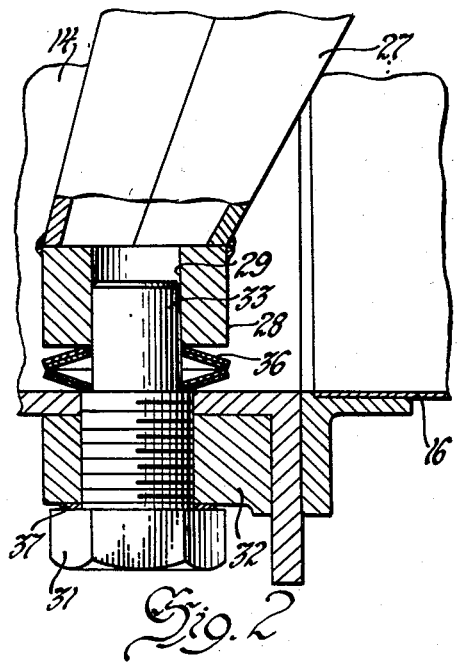
Figure 2 is an enlarged view of a portion of Figure 1.

The outer end of the arms 27 are supported with the casing ring 14 by the following structure illustrated in Figures 1 and 2: A ring 28 having an internal radial bore 29 is welded at the end of each arm. A bolt 31 threaded into a stiffening ring 32 welded to the casing ring 14 includes a pin 33 slidably received in the ring 28. This constitutes a telescoping connection in which the members 28 may slide radially of the case on the pin 33. The arm 27 is biased inwardly toward the center of the case by a stack of Belleville springs 36 which, as shown, comprises two sets coned in opposite directions with two springs in each set. The springs engage ring 28 and a shoulder on bolt 31. As will be apparent, any load urging the arm downwardly as shown in Figure 2 will compress springs 36 which thus transmit part of the load to the casing 14. A gasket or shim 37 may be provided under the head of bolt 31. By varying the thickness of the shim, the spring compression may be adjusted.

Figure 3:
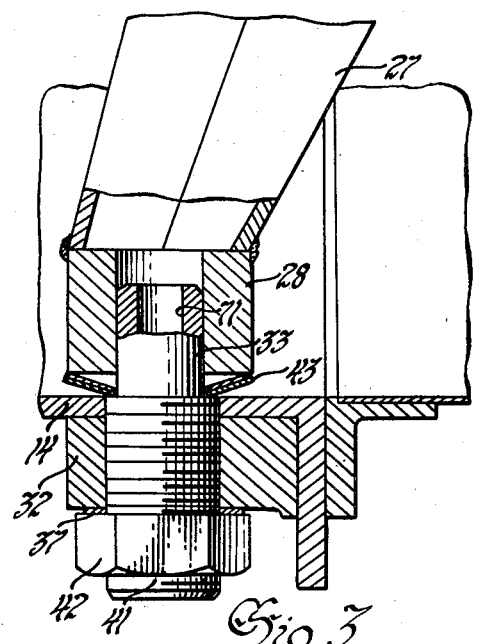
Figure 3 is a view similar to Figure 2 showing a second form of the invention.

The form of the invention shown in Figure 3 is similar in structure and operation to the form of Figure 2. The differences are that the pin 33 is integral with a stud 41 locked in place by a nut 42 and that a single set 43 of Belleville springs all coned in the same direction is provided. The stud may be adjusted radially of the casing and then be locked by the nut.

Figure 4:
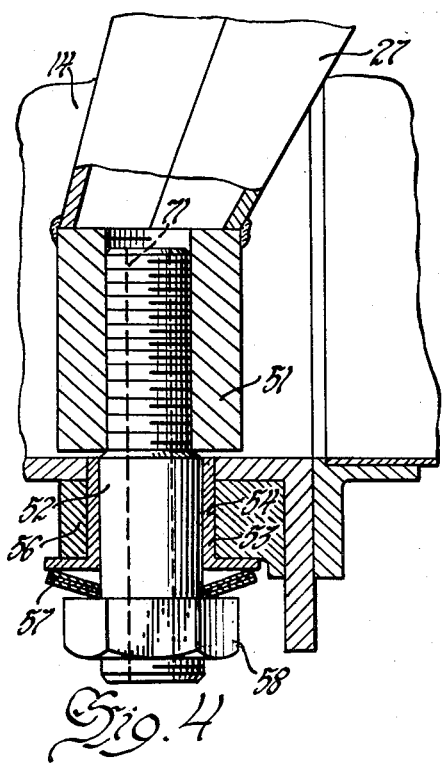
Figure 4 is a view similar to Figure 2 showing a third form of the invention.

In the form of Figure 4, the telescoping connection between the arm and case and the spring is put outside the case. This provides a cooler location for these parts, but requires somewhat more space outside the casing. In this form, a threaded collar 51 welded to the end of the arm 27 receives the inner end of a stud 52. The central cylindrical portion of stud 52 slides in a hard bushing 53 fitted in a radial bore 54 in the ring 56 which corresponds to ring 32 of Figure 2. Stud 52 is biased outwardly by a group 57 of Belleville springs mounted between the flange of bushing 53 and the nut 58 threaded on the outer end of the stud. With this structure, the springs load the arm 27 in tension rather than compression, but the ultimate result is the same in reducing the bending load on arms extending transversely to the applied load.

Figure 5:
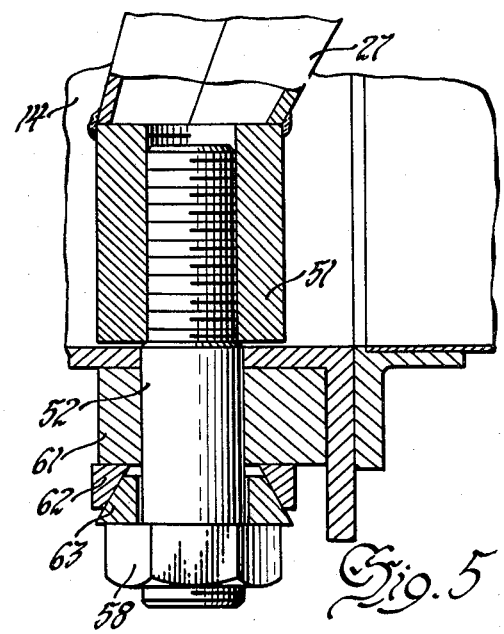
Figure 5 is a view similar to Figure 2 showing a fourth form of the invention.

Figure 5 shows a further form similar in some respects to that of Figure 4. The ring 51, stud 52 and nut 58 may be the same. The reinforcing ring 61 on the case is bored to receive the stud 52 for sliding movement. In this form, a telescoping ring spring comprising an outer internally coned spring 62 and an inner externally coned ring 63 is mounted between the nut 58 and the casing part 61.

The ring spring 62, 63 is a known type of spring. The rings are continuous and exert their spring action by distortion of the rings accompanied by sliding of one ring into the other. This type of spring has high frictional damping characteristics and a high load capacity for given space requirements.

It offers another advantage in this installation in that it may be utilized to compensate for relative expansion of the spider and casing. The actual expansion of the spider and casing will vary depending upon the materials, the structural dimensions, the extent to which the casing is cooled, and perhaps other factors. In most cases, the spider expands more than the casing when the engine heats up in service. In such case, by making the inner ring 63 of a material of higher coefficient of thermal expansion than ring 62, the ring 63 will expand more than ring 62, thus compensating for the greater radial expansion of the spider than the casing.

With respect to all four forms of the invention, it may be noted that the bolt or stud such as 31, 41, or 52 may be tubular as indicated at 71 in Figures 3 and 4. The bolt or stud may thus conduct cooling air to the spider.

The description herein of the preferred embodiment of the invention for the purpose of explaining the principles thereof is not to be construed as limiting the invention, as modifications may be made by the exercise of skill in the art without departing from the invention.

I claim:

1. A turbine comprising, in combination, a tubular casing having an axis and defining a path for hot gas, a spider mounted in the casing including radiating arms extending across the interior of the casing transversely to the axis thereof, a telescoping connection slidable radially of the axis between each arm and the casing, each connection comprising a member fixed to the arm and a member fixed to the casing, one said member including a pin extending radially of the casing and the other said member defining a bore slidably receiving the pin, and spring means engaging the members biasing each arm radially with respect to the axis.

2. A turbine as recited in claim 1 in which the spring means comprises a Belleville spring.

3. A turbine as recited in claim 1 in which the spring means comprises a spring mounted exteriorly of the casing.

4. A turbine as recited in claim 1 in which the spring means comprises telescoping ring springs.

5. A machine comprising, in combination, an annular casing, a rotor including a shaft, means within the casing supporting the shaft, a spider connected to the supporting means and the casing, means connecting the spider to the casing comprising a number of connections distributed circumferentially of the casing, each connection including a member fixed to the casing, a member fixed to the spider, one of said members of each connection being guided on the other member for relative movement radially of the casing, and spring means connected to the members biasing the members radially of the casing relative to each other.

6. A machine as recited in claim 5 in which the spring means comprises a Belleville spring mounted within the casing.

7. A machine as recited in claim 5 in which the spring means comprises a Belleville spring mounted exteriorly of the casing.

8. A machine as recited in claim 5 in which the spring means comprises telescoping ring springs.

9. A turbine comprising, in combination, an annular casing having an axis and defining a path for hot gas, a rotor including a shaft, means within the casing supporting the shaft, a spider connected to the supporting means and the casing, means connecting the spider to the casing comprising a number of connections distributed circumferentially of the casing, each connection including a member fixed to the casing, a member fixed to the spider, one of said members of each connection including a pin extending radially of the casing and the other said member defining a bore slidably receiving the pin, and spring means connected to the members biasing the members radially of the casing relative to each other.

10. A turbine as recited in claim 9 in which at least one of the pins is tubular and defines an air conduit from the spider to the exterior of the casing.

11. A turbine comprising, in combination, a tubular casing having an axis and defining a path for hot gas, a spider mounted in the casing including radiating arms extending across the interior of the casing transversely to the axis thereof, a telescoping connection slidable radially of the axis between each arm and the casing, and telescoping ring spring means connected to the arm and the casing biasing each arm radially with respect to the axis, the spring means comprising inter-engaging rings having different coefficients of thermal expansion cooperating to compensate for relative thermal expansion of the casing and spider.

12. A machine as recited in claim 5 in which the spring means comprises a Belleville spring.

13. A machine as recited in claim 5 in which the spring means comprises a spring mounted exteriorly of the casing.

14. A turbine as recited in claim 9 in which the spring means comprises a Belleville spring.

15. A turbine as recited in claim 9 in which the spring means comprises a spring mounted exteriorly of the casing.

16. A turbine comprising, in combination, a tubular casing having an axis and defining a path for hot gas, a spider mounted in the casing including a central bearing support and at least three rigid arms radiating from the bearing to the casing transversely to the axis thereof and spaced circumferentially of the casing, a telescoping sliding bearing connection slidable radially of the axis between each arm and the casing, and spring means connected between each arm and the casing biasing each arm radially with respect to the axis.

17. A turbine as recited in claim 16 in which the spring means comprises a Belleville spring.

18. A turbine as recited in claim 16 in which the spring means comprises a spring mounted exteriorly of the casing.

19. A turbine as recited in claim 16 in which the spring means comprises telescoping ring springs.

References Cited in the file of this patent

UNITED STATES PATENTS

| | | |
|---|---|---|
| 1,900,128 | Persons | Mar. 7, 1933 |
| 2,282,894 | Sheldon | May 12, 1942 |
| 2,573,159 | Noe | Oct. 30, 1951 |
| 2,575,889 | Oulianoff | Nov. 20, 1951 |
| 2,680,001 | Batt | June 1, 1954 |
| 2,727,796 | Sardou | Dec. 20, 1955 |

FOREIGN PATENTS

| | | |
|---|---|---|
| 7,528 | Great Britain | Mar. 29, 1898 |
| 166,516 | Great Britain | Nov. 3, 1921 |
| 938,684 | France | Apr. 12, 1948 |